(12) United States Patent  
Yedid Am et al.

(10) Patent No.: US 9,779,332 B2
(45) Date of Patent: Oct. 3, 2017

(54) CAPTURING IMAGE DATA OF PRINTER OUTPUT

(71) Applicant: Hewlett-Packard Indigo, B.V., Amstelveen (NL)

(72) Inventors: Tsafrir Yedid Am, Ness Ziona (IL); Ran Waidman, Ness Ziona (IL); Tair Atzmon, Ness Ziona (IL)

(73) Assignee: HP INDIGO B.V., Amstelveen (NL)

( * ) Notice: Subject to any disclaimer, the term of this patent is extended or adjusted under 35 U.S.C. 154(b) by 0 days.

(21) Appl. No.: 14/908,387

(22) PCT Filed: Jul. 31, 2013

(86) PCT No.: PCT/EP2013/066118
§ 371 (c)(1),
(2) Date: Jan. 28, 2016

(87) PCT Pub. No.: WO2015/014399
PCT Pub. Date: Feb. 5, 2015

(65) Prior Publication Data
US 2016/0189014 A1    Jun. 30, 2016

(51) Int. Cl.
*G06K 15/02* (2006.01)
*B41F 33/00* (2006.01)
*H04N 1/50* (2006.01)
*H04N 1/60* (2006.01)

(52) U.S. Cl.
CPC ........ *G06K 15/027* (2013.01); *B41F 33/0081* (2013.01); *G06K 15/1897* (2013.01); *H04N 1/506* (2013.01); *H04N 1/6036* (2013.01)

(58) Field of Classification Search
CPC .................................................. G06K 15/1897
See application file for complete search history.

(56) References Cited

U.S. PATENT DOCUMENTS 4,963,899 A    10/1990    Resch, III
5,125,037 A    6/1992    Lehtonen et al.
7,187,472 B2   3/2007    Friedman et al.
(Continued)

FOREIGN PATENT DOCUMENTS

EP    2422980 A1    2/2012
EP    2537677 A1    12/2012

OTHER PUBLICATIONS

International Search Report and Written Opinion dated Apr. 22, 2014, PCT Patent Application No. PCT/EP2013/066118 filed Jul. 31, 2013, European Patent Office.
(Continued)

*Primary Examiner* — Marivelisse Santiago Cordero
*Assistant Examiner* — Lennin Rodriguezgonzalez
(74) *Attorney, Agent, or Firm* — HP Inc. Patent Department

(57) ABSTRACT

An apparatus and method for use in capturing image data of an output of a printing device during a print run, the method comprising capturing a first portion of image data of a first spread, capturing a second portion of image data of a second spread, wherein the location of the second portion of image data on the second spread is different from the location of the first portion of image data on the first spread, and combining the first portion with the second portion to generate oversampled image data.

18 Claims, 3 Drawing Sheets

(56) References Cited

U.S. PATENT DOCUMENTS

| | | |
|---|---|---|
| 7,760,397 B2 | 7/2010 | Hosier |
| 7,800,779 B2 | 9/2010 | Fan et al. |
| 2003/0053093 A1* | 3/2003 | Eom .................. H04N 1/506 |
| | | 358/1.9 |
| 2010/0271640 A1* | 10/2010 | Yamamoto ............ G03G 15/50 |
| | | 358/1.5 |
| 2011/0075162 A1 | 3/2011 | Saettel et al. |
| 2011/0216979 A1* | 9/2011 | Barkol .................... G06K 9/68 |
| | | 382/218 |
| 2011/0228115 A1 | 9/2011 | Ben-Ezra |
| 2013/0088715 A1 | 4/2013 | Adam et al. |
| 2013/0172731 A1* | 7/2013 | Gole .................. A61B 5/0035 |
| | | 600/424 |

OTHER PUBLICATIONS

Anoop K. Bhattacharjya, "Closed-loop Color Calibration for the Home User", Epson Palo Alto Laboratory, Palo Alto, CA 94304; 9 pages.

* cited by examiner

CAPTURING IMAGE DATA OF PRINTER OUTPUT

CLAIM FOR PRIORITY

The present application is a national stage filing under 35 U.S.C. §371 of PCT application number PCT/EP2013/066118, having an international filing date of Jul. 31, 2013, the disclosure of which is hereby incorporated by reference in its entirety.

BACKGROUND

Modern printers and printing presses can include a number of technologies to help ensure accurate reproduction of the printed subject matter. For individual or small numbers of prints accurate calibration of the printing device before printing may ensure accurate reproduction. However, for high numbers of consecutive prints, gradual changes, such as positional errors, in the printing device may accumulate over time leading to a loss of accuracy towards the end of a print run.

BRIEF INTRODUCTION OF THE DRAWINGS

Examples of the present invention are further described hereinafter by way of example only with reference to the accompanying drawings, in which.

DETAILED DESCRIPTION OF AN EXAMPLE

Figure 1:
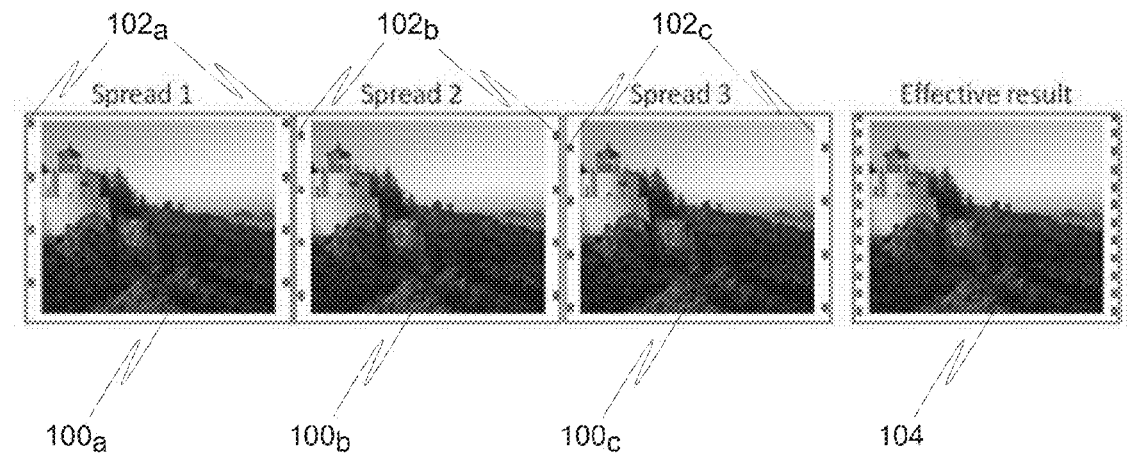
FIG. 1 illustrates image lines captured from successive spreads according to one example of the invention.

One way of ensuring ongoing accuracy of reproduction during a large print run is to implement continuous calibration of the print device during operation. By monitoring the spreads, or prints, produced by the printing device during the run, errors may be detected and calibration information updated to compensate for any changes and ensure the accuracy of each output print remains within desired tolerances.

Such continuous calibration may require the output of the printing device to be monitored throughout the print run. Typically, this is achieved using one or more image capture devices, such as an in-line camera or in-line scanner. However, commonly used image capture devices may have limited operating speed, or may have limited resolution when operating at high speeds. This means that the throughput of the printing device may be limited by the operating speed of the image capture device when applying continuous calibration.

In general, a higher throughput of a printing device, such as a printing press, is desired as this allows an operator to maximize the productivity of the press which may represent a substantial capital investment. Thus, a continuous calibration process that reduces the throughput of the printing device may not be appropriate for some end users. Alternatively, reducing the resolution of the image capture device can lead to the resolution of data points captured by the device being poor, and this in turn limits the ability to accurately detect and correct errors during print runs.

One possible solution would be to use an image capture device with a higher sampling rate. However, such devices are much more expensive and generally have limited resolution leading to the problems described above. An alternative approach has been to employ more advanced algorithms to attempt to overcome the inherent limitations in the image capture hardware. However, such approaches remain limited by the quality of data captured.

In order to provide high resolution data of spreads passing through a printing device, without limiting throughput of the printing device, some examples of the present invention apply a method of oversampling using an image capturing device. The described method is applicable to a range of image sampling devices, such as an in-line camera, in-line scanner, in-line spectrophotometer, or the like.

In general, it can be assumed that changes in the behavior of the printing device over time are relatively slow, and therefore a sequence of a small number of consecutive spreads can be assumed to reflect the same behavior. Some examples of the invention exploit the slow changes in the printing device by combining relatively low resolution data captured from a number of spreads into a single high resolution image or data point.

The method relies on shifting a position of the image capturing device between spreads, such that a different portion of a spread is captured for each spread in a sequence of spreads, which when combined allow an image of higher density than the capability of the device in the given process velocity to be produced. The disclosed method collects data over more than one spread, and for each spread shifts the camera capture location in a phase with respect to the original location. For example, some examples may use two spreads with a phase of half the distance between two registration marks, three spreads with a phase of third that distance, etc.

FIG. 1 shows one arrangement in which different captured portions of a number of spreads 100a, 100b, 100c can be used to generate a higher resolution representation 104 of the output of the printing device. In the example shown in FIG. 1, the capture location of the image capture device relative to the spreads is shifted by a third of the distance between two registration marks 102 between measurement of each spread. Thus, for a first spread 100a image data corresponding to registration marks 102a is captured by the image capture device, and for second 100b and third 100c subsequent spreads image data corresponding to registration marks 102b and 102c is captured.

The image data captured from each spread can then be combined to produce an oversampled image 104. Thus, the image capture device can operate at relatively low resolution and/or speed while still enabling a high resolution image 104 of the spreads to be generated to enable accurate continuous calibration of the printing device.

One example implementation is the specific case of continuous calibration of the Colour Plane Registration (CPR) using an In-Line Camera. Colour plane misregistration is a common problem in printing presses, and in particular sheet fed presses. In the sheet fed process, the printed separations are transferred from a blanket to a substrate one after the other, and hence, different colours may be deposited shifted one from the other in the final print. This results in significant printing artifacts and a reduced perceived quality of the printing press output.

To continuously calibrate the CPR in a printing device, an In-Line Camera may be used. The CPR error may differ depending on the location on the substrate, and the task of the calibration algorithm is to reevaluate the CPR error for all possible locations on the substrate based on the measurements taken by the In-Line Camera. The CPR error for each location may be evaluated using a polynomial for on the measured data points. The process velocity may typically be more than 2000 mm/s, and therefore the ability of the In-Line Camera to capture a sufficient number of shots along an individual substrate is very limited.

However, by performing the desired measurements across a number of spreads, the operating speed of the In-Line Camera can be decoupled from the process velocity of the printing press. For example, by performing the required image capture over two spreads, the time available for the In-Line Camera to capture the desired image data is doubled, and for three spreads, tripled, and so on. In common with many changes in the printing press, CPR errors generally change slowly in time, and thus several following spreads can be regarded as reflecting the same CPR error behavior. This means that the image data captured from a number of following spreads can be combined to accurately reflect the CPR errors present at the output of the printing press.

Figure 2:
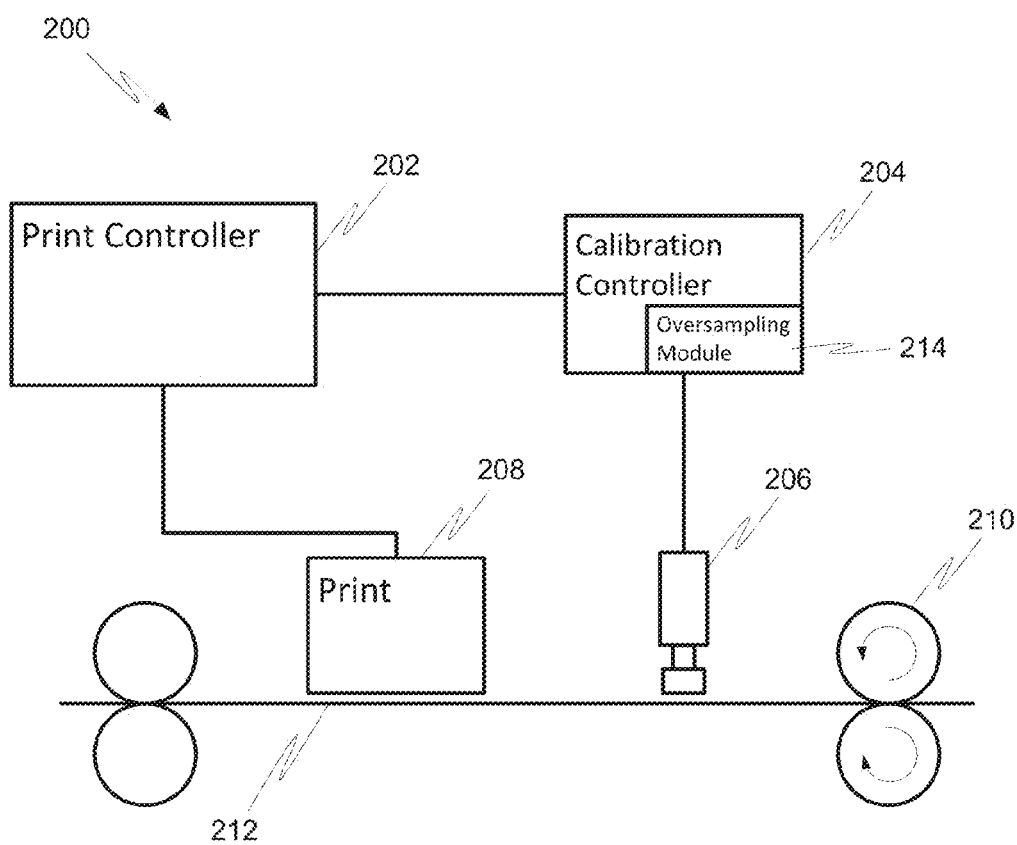
FIG. 2 illustrates a system operable to implement example of the invention.

FIG. 2 illustrates a system 200 for implementing some examples of the invention. The system 200 comprises a print controller 202 that controls a print unit 208 to transfer an image to a substrate 212. An in-line camera 206 images the printed substrate and provides the captured image data to a calibration controller module 204 that includes oversampling module 214. The calibration controller 204 is coupled to the print controller 202 to supply calibration information for use in controlling the print unit 208. The substrate 212 is drawn through the system, and past both the print unit 208 and the in-line camera 206 by rollers 210.

In operation, a first printed substrate 212 travels past the in-line camera 206 which captures image data for a first portion of the substrate under control of the oversampling module 214. The in-line camera 206 then captures a second portion of a second printed substrate, and so on for further substrates as required. The oversampling module 214 receives the captured first portion and the captured second portion, etc. and combines the captured portions of the substrates into a single oversampled image. The over-samples image is then used in the calibration controller 204 as part of a continuous calibration algorithm to identify any changes in the operation of the printing press, such as CPR errors. The calibration controller 204 then provides updated calibration information to the print controller 202 to ensure the operation of the printing device remains within the desired tolerances for the print run.

Figure 3:
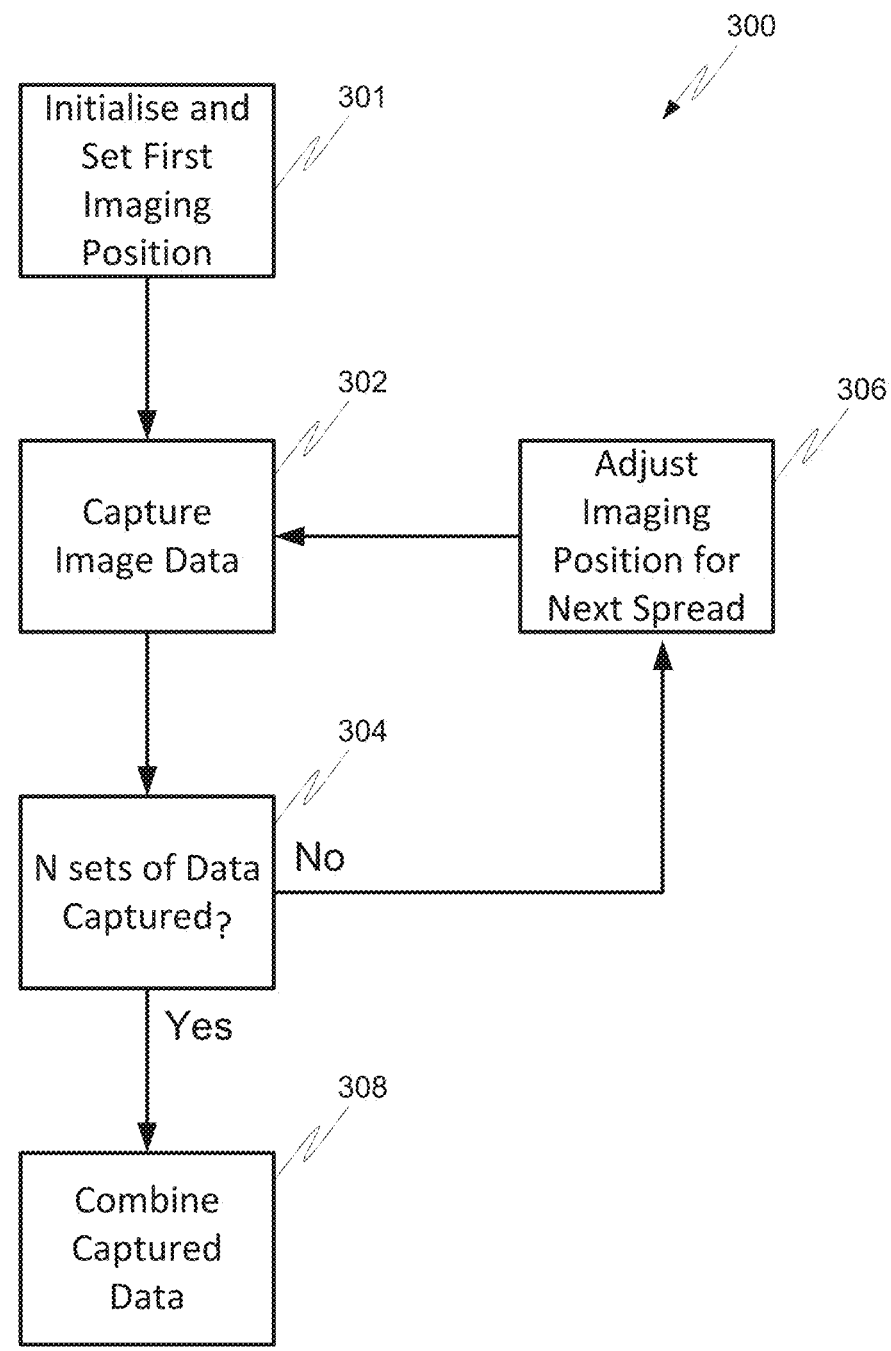
FIG. 3 illustrates a method according to an example of the invention.

FIG. 3 illustrates a method according to some examples of the invention. According to the method 300 of FIG. 3, the method starts by initializing the imaging device, such as the in-line camera 206, to a first imaging position. At step 302, image data for a first spread is then captured by the image capture device. A check is then made to determine if the required, N, number of data sets have been captured 304, and if not the method proceeds to step 306 in which the imaging position is adjusted for the next spread. The image data for the next spread is then captured 302 at the adjusted imaging position and a further check is made to determine if the desired number of data sets have been captured. This loop continues for subsequent spreads until the desired number of data sets has been captured, and then the method proceeds to step 308 in which the data sets are combined to generate an oversampled image representative of the output of the printing press.

Figure 4:
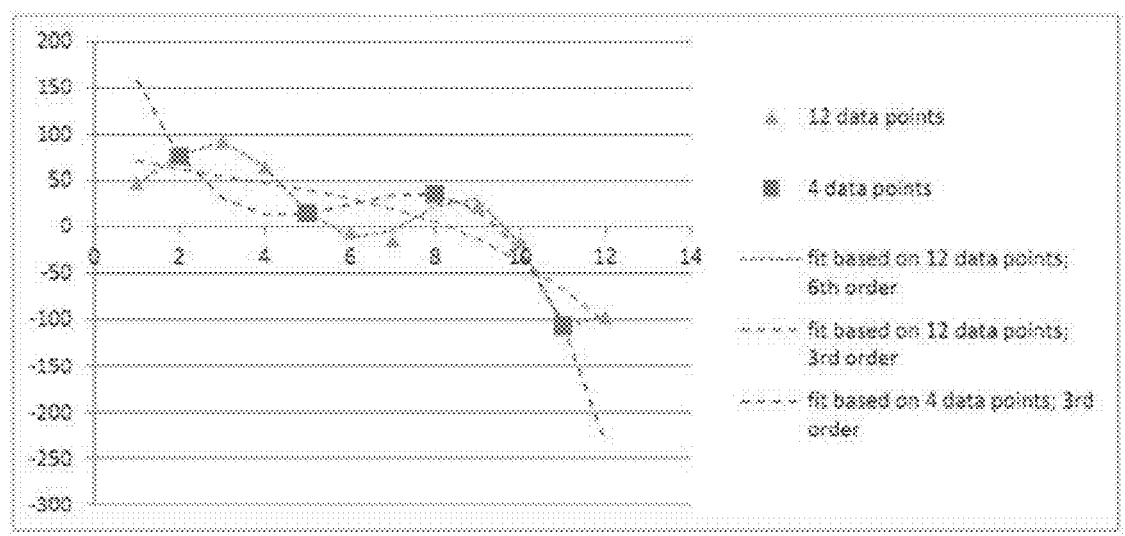
FIG. 4 shows a graph of image data captured using different image capture methodologies.
Figure 5:
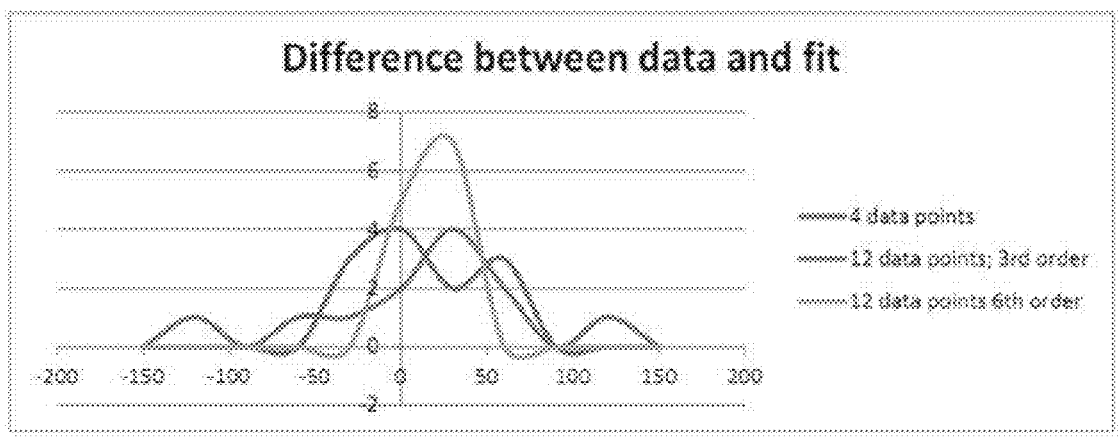
FIG. 5 shows a graph illustrating the accuracy of image data captured using the different image capture methodologies.

In an example, we assume that the CPR error along the substrate can be described as twelve discrete values, however due to a high process velocity only four can be captured by the in-line camera in one spread. The graph in FIG. 4 shows the ability of a continuous calibration algorithm to reevaluate the data based on only the four data points as compared to if the whole 12 data points are captured over three spreads using the described oversampling technique. For the scenario in which only four data points are recorded, it is only possible to apply a third order polynomial fit to the data, however a further advantage of the described techniques is that a larger number of data points allows a higher order polynomial regression to be applied to the data. It is clear from the plots shown in FIG. 3 that very different results, and therefore different calibration settings, result from four data points as opposed to twelve data points supplied using the oversampled technique.

FIG. 4 provides a histogram of the difference between the fit and the original data points. As can be seen in FIG. 4, the errors associated with the fitted data are significantly reduced for the oversampled (twelve data points) examples, as opposed to the four data points available without oversampling.

The results of further statistical calculations on the above example result in the information shown in the table below. As can clearly be seen, the size of one standard deviation in the measurement error is significantly reduced, and therefore the accuracy of the captured data is significantly increased through use of the described oversampling technique.

|  | Standard Deviation | 95 Percentile |
| --- | --- | --- |
| 4 data points; $3^{rd}$ order polynomial | 60.7 μm | 122.7 μm |
| 12 data points; $3^{rd}$ order polynomial | 30.4 μm | 38.8 μm |
| 12 data points; $6^{th}$ order polynomial | 5.9 μm | 11.7 μm |

The above examples have been described in the context of continuous calibration of colour plane registration using an in-line camera. However, the disclosed technique may be applied to other calibration tasks, for example calibration of print density or uniformity at different wavelengths using an in-line spectrophotometer or to calibrate scaling linearity of a printer using an in-line scanner or camera.

Thus, some examples of the invention are able to provide oversampled image data by combining image data captured from different portions of sequential spreads. As calibrated aspects of a printer can be assumed to change relatively slowly, the multiple sequential spreads can be assumed to be identical and therefore, combining the data captured from different spreads provides a high resolution output without requiring use of a higher speed/resolution camera. Therefore, the use of oversampled image data may increase the accuracy of captured data over prior art cases without limiting throughput of the printing device, or requiring a more expensive high speed image capture system to be used.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of capturing image data of an output of a printing device during a print run, the method comprising:
   capturing an image of a first printed media;
   capturing an image of a second printed media, wherein the first printed media and the second printed media comprise registration marks, wherein the captured images of the first printed media and the second printed media are captured based on the registration marks, and wherein a location at which the image of the second printed media is captured is shifted by half the distance between registration marks relative to a location at which the image of the first printed media is captured; and
   combining the image of the first printed media with the image of the second printed media to generate a combined image, wherein the image of the first printed media is interposed with the image of the second printed media in the combined image.

2. The method of claim 1, further comprising capturing an image of a further printed media, wherein the further printed media is different from the first printed media and the second printed media.

3. The method of claim 2, wherein the first printed media, the second printed media, and the further printed media each comprises registration marks, and wherein the location of each captured image of the first printed media, the second printed media, and the third printed media is shifted by a distance equal to the distance between registration marks on a printed media divided by the number of printed media images to be captured.

4. The method of claim 1, further comprising capturing the images of the first printed media and the second printed media using one of an in-line camera, an in-line scanner, or a spectrophotometer.

5. The method of claim 1, further comprising: adjusting at least one calibration parameter of the printing device based on the combined image.

6. The method of claim 5, wherein the at least one calibration parameter comprises one of colour plane registration, uniformity and scaling linearity.

7. A non-transitory computer readable medium on which is stored computer program code that when executed by a processor cause the processor to:
   capture an image of a first printed media;
   capture an image of a second printed media, wherein the first printed media and the second printed media comprise registration marks, wherein the captured images of the first printed media and the second printed media are captured based on the registration marks, and wherein a location at which the image of the second printed media is captured is shifted by half the distance between registration marks relative to a location at which the image of the first printed media is captured; and
   combine the image of the first printed media with the image of the second printed media to generate a combined image, wherein the image of the first printed media and the image of the second printed media are visible in the combined image.

8. The non-transitory computer readable medium of claim 7, wherein the computer program code is further to cause the processor to:
   capture an image of a further printed media, wherein the further printed media is different from the first printed media and the second printed media, wherein the first printed media, the second printed media, and the further printed media each comprises registration marks, and wherein the location of each captured image of the first printed media, the second printed media, and the third printed media is shifted by a distance equal to the distance between registration marks on a printed media divided by the number of printed media images to be captured.

9. The non-transitory computer readable medium of claim 7, wherein the computer program code is further to cause the processor to:
   capture the images of the first printed media and the second printed media using one of an in-line camera, an in-line scanner, or a spectrophotometer.

10. The non-transitory computer readable medium of claim 7, wherein the computer program code is further to cause the processor to:
   adjust at least one calibration parameter of the printing device based on the combined image.

11. The non-transitory computer readable medium of claim 10, wherein the at least one calibration parameter comprises one of colour plane registration, uniformity and scaling linearity.

12. An apparatus comprising:
   an image data capture device;
   a controller; and
   a memory on which is stored instructions that are to cause the controller:
      capture an image of a first printed media;
      capture an image of a second printed media;
      capture an image of a further printed media, wherein the further printed media is different from the first printed media and the second printed media, wherein the first printed media, the second printed media, and the further printed media each comprises registration marks, and wherein the location of each captured image of the first printed media, the second printed media, and the third printed media is shifted by a distance equal to the distance between registration marks on a printed media divided by the number of printed media images to be captured; and combine the image of the first printed media with the image of the second printed media to generate a combined image, wherein the image of the first printed media is intermixed with the image of the second printed media in the combined image.

13. The apparatus of claim 12, wherein the image capture device comprises an in-line camera.

14. The apparatus of claim 12, wherein the image capture device comprises one of: an in-line scanner or an in-line spectrophotometer.

15. The apparatus of claim 12, wherein the apparatus is a printing device.

16. The apparatus claim 15, wherein the controller is further to adjust at least one calibration parameter of the printing device based on the combined image.

17. The apparatus of claim 16, wherein the at least one calibration parameter comprises one of colour plane registration, uniformity and scaling linearity.

18. The apparatus according to claim 12, wherein the first printed media and the second printed media comprise registration marks, wherein the captured images of the first printed media and the second printed media are captured based on the registration marks, and wherein a location at which the image of the second printed media is captured is shifted by half the distance between registration marks relative to a location at which the image of the first printed media is captured.

* * * * *